US 9,144,868 B2

United States Patent
Huang et al.

(10) Patent No.: US 9,144,868 B2
(45) Date of Patent: Sep. 29, 2015

(54) AUTO-CENTERING APPARATUS OF A STEADY REST

(71) Applicant: INDUSTRIAL TECHNOLOGY RESEARCH INSTITUTE, Hsin-Chu (TW)

(72) Inventors: Hua-Chih Huang, Taichung (TW); Shih-Jie Wei, Taichung (TW); Hsin-Chuan Su, Yunlin County (TW)

(73) Assignee: INDUSTRIAL TECHNOLOGY RESEARCH INSTITUTE, Hsin-Chu (TW)

( * ) Notice: Subject to any disclaimer, the term of this patent is extended or adjusted under 35 U.S.C. 154(b) by 123 days.

(21) Appl. No.: 14/091,066

(22) Filed: Nov. 26, 2013

(65) Prior Publication Data

US 2015/0020656 A1    Jan. 22, 2015

(30) Foreign Application Priority Data

Jul. 16, 2013  (TW) .............................. 102125391 A (51) Int. Cl.
*B23Q 1/76* (2006.01)
*B23Q 1/00* (2006.01)

(52) U.S. Cl.
CPC ... *B23Q 1/76* (2013.01); *B23Q 1/00* (2013.01)

(58) Field of Classification Search
CPC ................................ B23Q 1/76; B23Q 41/065
See application file for complete search history.

(56) References Cited

U.S. PATENT DOCUMENTS

| | | | |
|---|---|---|---|
| 429,800 A | 6/1890 | Thompson | |
| 2,459,068 A * | 1/1949 | Eastwood | ..................... 451/408 |
| 3,234,829 A * | 2/1966 | Dinsmore | ........................ 82/164 |
| 4,416,174 A * | 11/1983 | Owsen | .............................. 82/162 |
| 4,463,635 A * | 8/1984 | Hafla et al. | ....................... 82/162 |
| 4,519,279 A * | 5/1985 | Ruggeri | ........................... 82/162 |
| 4,553,843 A | 11/1985 | Langley et al. | |
| 4,754,673 A * | 7/1988 | Hiestand | .......................... 82/164 |
| 4,823,657 A * | 4/1989 | Welin-Berger | ................. 82/162 |
| 7,597,035 B2 | 10/2009 | Rehm | |
| 2008/0139092 A1* | 6/2008 | Lessway | ........................ 451/408 |
| 2010/0251863 A1 | 10/2010 | Sakai et al. | |

(Continued)

FOREIGN PATENT DOCUMENTS

| | | |
|---|---|---|
| CN | 200963684 Y | 10/2007 |
| CN | 100382919 C | 4/2008 |
| CN | 202015950 U | 10/2011 |

(Continued)

OTHER PUBLICATIONS

Intellectual Property Office, Ministry of Economic Affairs, R.O.C., "Office Action", Taiwan, Apr. 10, 2015.

(Continued)

*Primary Examiner* — Will Fridie, Jr.
(74) *Attorney, Agent, or Firm* — Locke Lord LLP; Tim Tingkang Xia, Esq.

(57) ABSTRACT

An auto-centering apparatus of a steady rest has: a base part; a main support part installed on the top of the base part, and a loading unit installed on the top of the main support part; at least one side support part installed on the top of the base part and located at least one side of the main support part, and a loading unit installed on the top of the side support part; a lift-up module installed in the base part and coupled to the main support part; and a connecting unit installed between the main support part and the side support part.

11 Claims, 8 Drawing Sheets

(56) References Cited

U.S. PATENT DOCUMENTS

2011/0259162 A1 10/2011 Nakakubo et al.
2013/0014620 A1 1/2013 Hangleiter et al.

FOREIGN PATENT DOCUMENTS

| CN | 102275104 A | 12/2011 |
| CN | 202498365 U | 10/2012 |
| CN | 202517285 U | 11/2012 |
| CN | 202517286 U | 11/2012 |
| CN | 202639861 U | 1/2013 |
| CN | 202655918 U | 1/2013 |
| EP | 0225984 A2 | 6/1987 |
| EP | 0988923 A1 | 3/2000 |
| EP | 2145726 A1 | 1/2010 |
| EP | 2433742 A1 | 3/2012 |
| TW | 304451 | 5/1997 |
| TW | 496802 B | 8/2002 |
| TW | 501959 B | 9/2002 |
| TW | 537941 B | 6/2003 |
| TW | M366433 | 10/2009 |
| TW | M456868 U1 | 7/2013 |

OTHER PUBLICATIONS

Chun-Feng Wang, Finite Element Analysis for studying Static Performance of Four Oil-Pad Hydrostatic Center Rest, Journal of Mechanical Engineers, 2011, pp. 84-86, vol. 8.
Li-Qiang Li et al., Auto-Centering Structure for Bearings, Design and Research, 2009, pp. 96-70, vol. 10.
Jun Du et al., Study and Design of Hydrostatic Center Rest for Horizontal Machine, Fluid Power Transmission and Control, 2012, pp. 31-34, vol. 11.
Junpeng Shao et al., , Flow Field Simulation on the Hydrostatic Bearing of Heavy-duty Horizontal Boring Lathe, Jul. 2010, pp. 55-57, 90, vol. 35 No. 7.
Wu Bo et al., Research on the Pressure Field of Hydrostatic Center Rest, International Conference on Electronic & Mechanical Engineering and Information Technology, Aug. 12-14, 2011, pp. 458-461.
Peng Fei Chao et al., Improvement of Extra-Heavy-Duty High-Precision Hydrostatic Center Rest, Technology Forum, 2012, pp. 47-49; vol. 3.

* cited by examiner

AUTO-CENTERING APPARATUS OF A STEADY REST

CROSS REFERENCE TO RELATED APPLICATION

This application also claims priority to Taiwan Patent Application No. 102125391 filed in the Taiwan Patent Office on Jul. 16, 2013, the entire content of which is incorporated herein by reference.

TECHNICAL FIELD

The present disclosure relates to an auto-centering apparatus of a steady rest, and more particularly, to a steady rest with synchronization centering ability.

BACKGROUND

In most turning machine tools, especially for heavy-duty lathes, a common contact steady rest is generally employed, that is, the supporting claws of the steady rest, usually in a number of three, are orientated and disposed for allowing the same to engage with a workpiece directly and thus enabling the heavy workpiece to be fixed securely so as to be processed by tools fitted in the machine tool.

Nevertheless, it is important to have the aforesaid supporting claws properly centered so as to ensure the workpiece to be processed with sufficient accuracy. However, the centering of those supporting claws is not synchronized, but is performed respectively that causes the centering of the steady rest to be a very time consuming task, and generally can also cause large concentricity deviation. Therefore, it is in need of a steady rest with synchronization centering ability.

SUMMARY

The present disclosure provides an auto-centering apparatus of a steady rest, comprising:
- a base part;
- a main support part, installed on the top of the base part;
- at least one side support part, installed on the top of the base part and each located at one side of the main support part;
- a lift-up module, installed in the base part and coupled to the main support part; and
- a connecting unit, installed at a position between the main support part and the at least one side support part.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1:
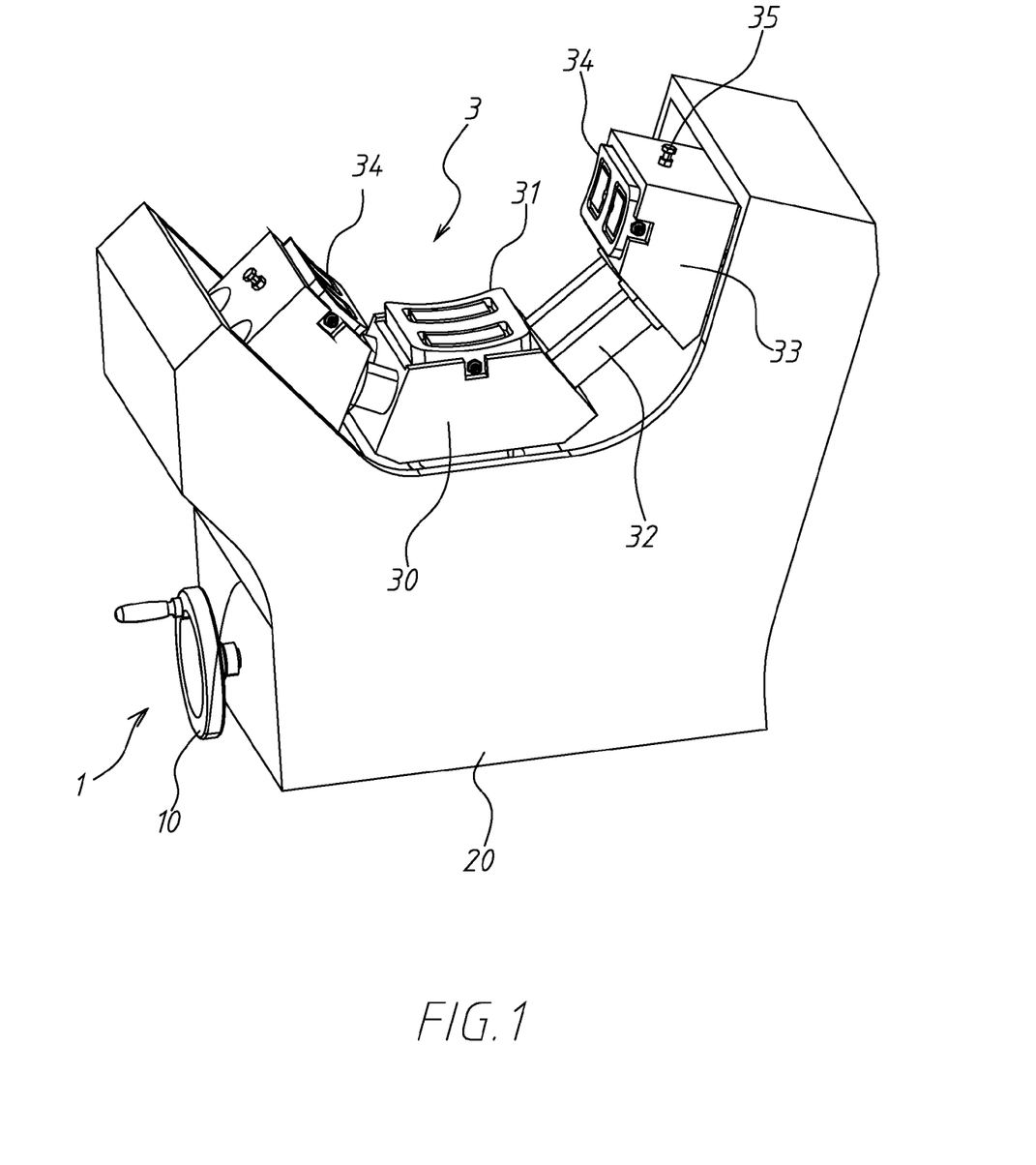
FIG. 1 is a schematic diagram showing an auto-centering apparatus of a steady rest according to a first embodiment of the present disclosure.
Figure 2:
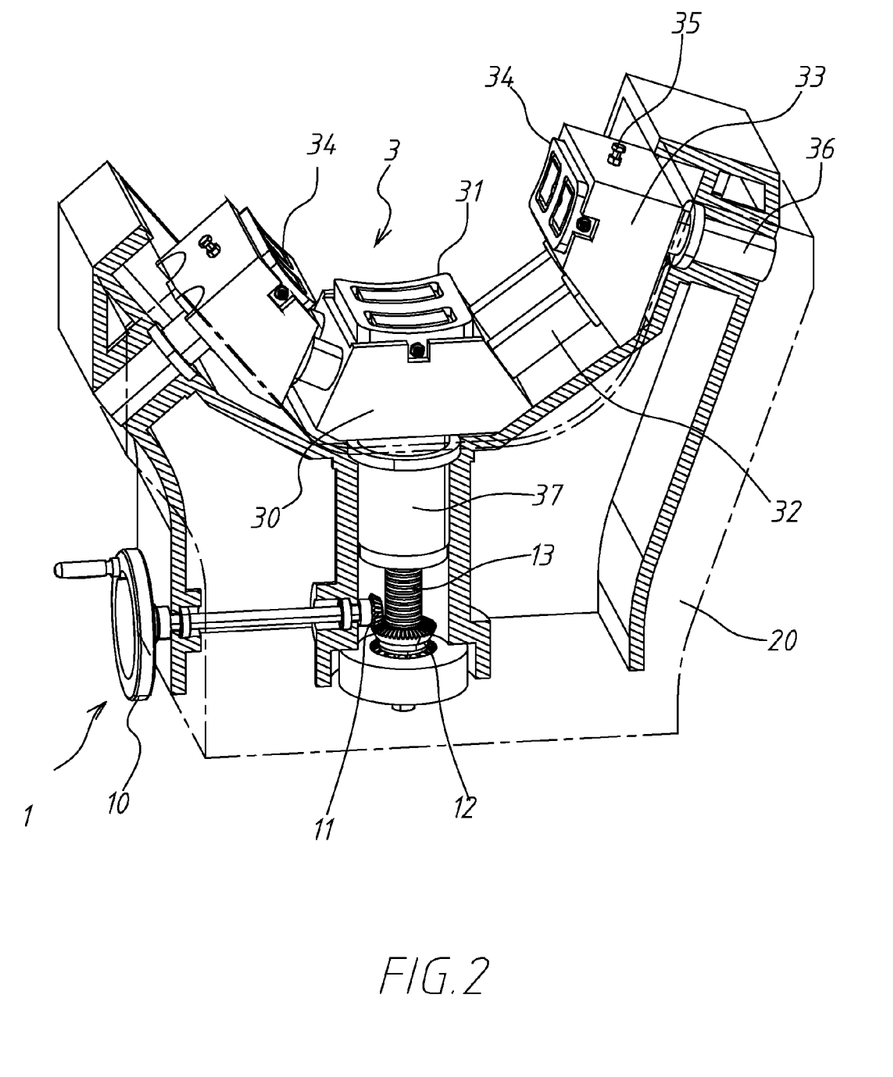
FIG. 2 is a partial cross sectional view of the auto-centering apparatus of a steady rest shown in the first embodiment of the present disclosure.

Please refer to FIG. 1 and FIG. 2, which show an auto-centering apparatus of a steady rest according to a first embodiment of the present disclosure. In this first embodiment, the auto-centering apparatus of a steady rest comprises: a base part 20, a lift-up module 1 and a support module 3.

As shown in FIG. 2, the lift-up module 1 is disposed inside the base part 20, and is composed of a hand wheel 10, a first driving gear 11, a second driving gear 12 and a lead rod 13 in a manner that the hand wheel 10 is disposed at a side of the base part 20 while allowing an end of the hand wheel 10 to extend to the outside of the base part 20, the first driving gear 11 is coupled to the hand wheel 10 at a side thereof opposite to the base part 20, the second driving gear 12 is coupled to the first driving gear 11, and the lead rod 13 is coupled to the second driving gear 12. In this embodiment, the first and the second driving gears 11, 12 are both bevel gears, by that the first driving gear 11 is disposed meshing to the second driving gear 12, and moreover, the lead rod 13 is substantially a lead screw.

The support module 3, being arranged at the top of the base part 20, is composed of a main support part 30, at least one connecting unit 32, at least one side support part 33, at least one loading unit 31, 34 and at least one adjustment unit 35.

The main support part 30 that is arranged at the top of the base part 20 is configured with a main support rod 37 at the bottom thereof, whereas the main support rod 37 is coupled to the lead rod 13. In an embodiment when the lead rod 13 is substantially a lead screw, the main support rod 37 is screw-fixed to an end of the lead rod 13 that is opposite to the one end coupling to the second driving gear 12.

The at least one side support part 33 is located at one side of the main support part 30. In this embodiment, there are two such side support parts 33 whereas this two side support parts 33 are disposed respectively at the two sides of the main support part 30. It is noted that the amount of the side support parts required and used in the auto-centering apparatus of the present disclosure is dependent only upon actual requirement, and thus is not limited by the aforesaid embodiment.

In addition, each side support part 33 is further configured with a side support rod 36 in the bottom that is arranged for allowing one end thereof to movably extend into the base part 20.

The movable loading units 31, 34 are disposed at the top of the main support part 30 and the side support part 33 respectively that allow the two to be connected respectively to the main support rod 37 and the side support rod 36. In an embodiment, each of the loading unit 31, 34 is substantially a hydrostatic bearing pad having a recessed pocket defined on the top thereof, and the hydrostatic bearing pad is able to receive sufficient amount of pressurized oil therein.

The connecting unit 32 is arranged to connect the side support part 33 and the main support part 30, which adopts a design of prismatic joint. In the present disclosure, the joint of the connecting unit 32 can be a hydraulic cylinder or an assembly of linkage bars and sleeves.

Figure 3:
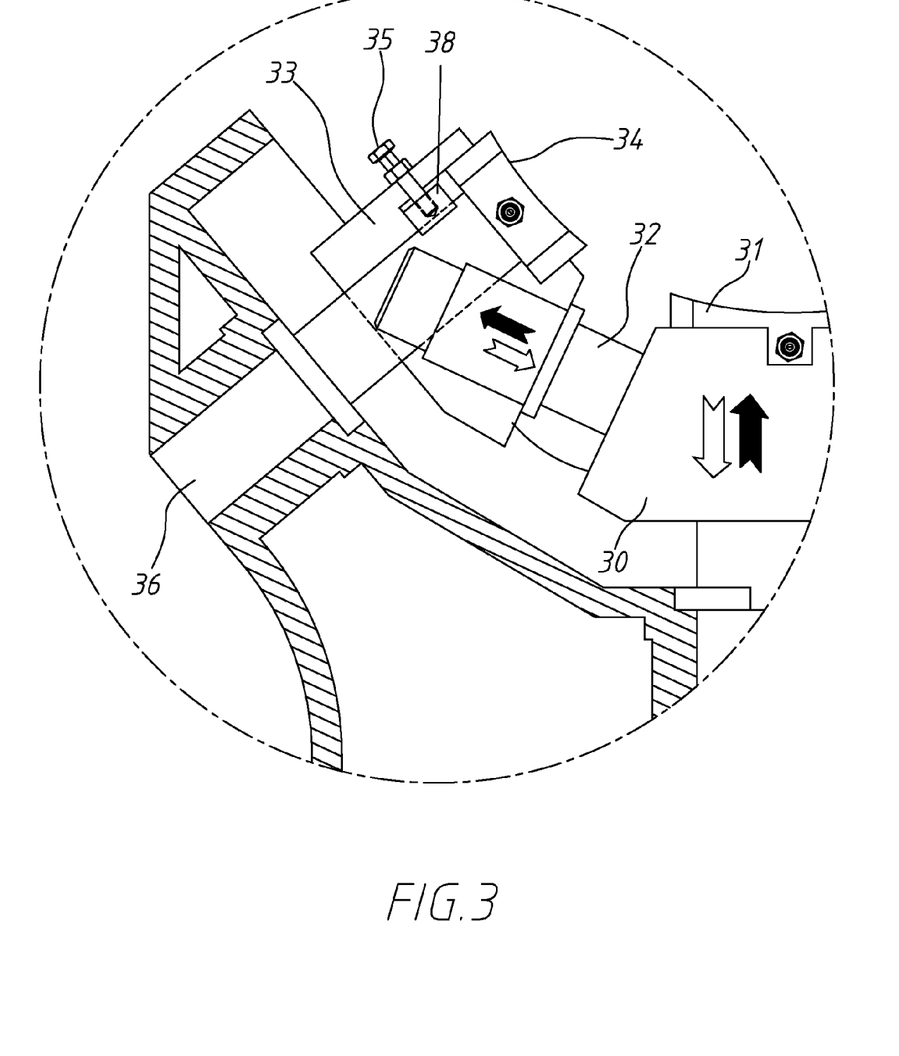
FIG. 3 is a partial cross sectional view of a main support part and a side support part used in an auto-centering apparatus of a steady rest according to the present disclosure.

Please refer to FIG. 3, which is a partial cross sectional view of a main support part and a side support part used in an auto-centering apparatus of a steady rest according to the present disclosure. As shown in FIG. 3, there are adjustment units 35 that are disposed at a side of the side support part 33 and the main support part 30 in respective while allowing those adjustment units 35 to couple respectively to the main support rod 37 and the side support rod 36. In detail, there is one adjustment units 35 that is disposed at a side of the main support part 30 while allowing the same to couple to the main support rod 37 for fixing one loading unit 31, and also there is another adjustment units 35 that is disposed at a side of the side support part 33 while allowing the same to couple to the side support rod 36 for fixing another loading unit 34. In this embodiment, the adjustment unit 35 is substantially an adjusting screw having a lock block 38 screwed to an end thereof, whereas the lock block 38 is arranged adjacent respectively against to the main support rod 37 and the side support rod 36 so as to fix the loading units 31, 34 to the main support part 30 and the side support part 33. In this embodiment, the lock block 38 is a metal block.

Figure 4:
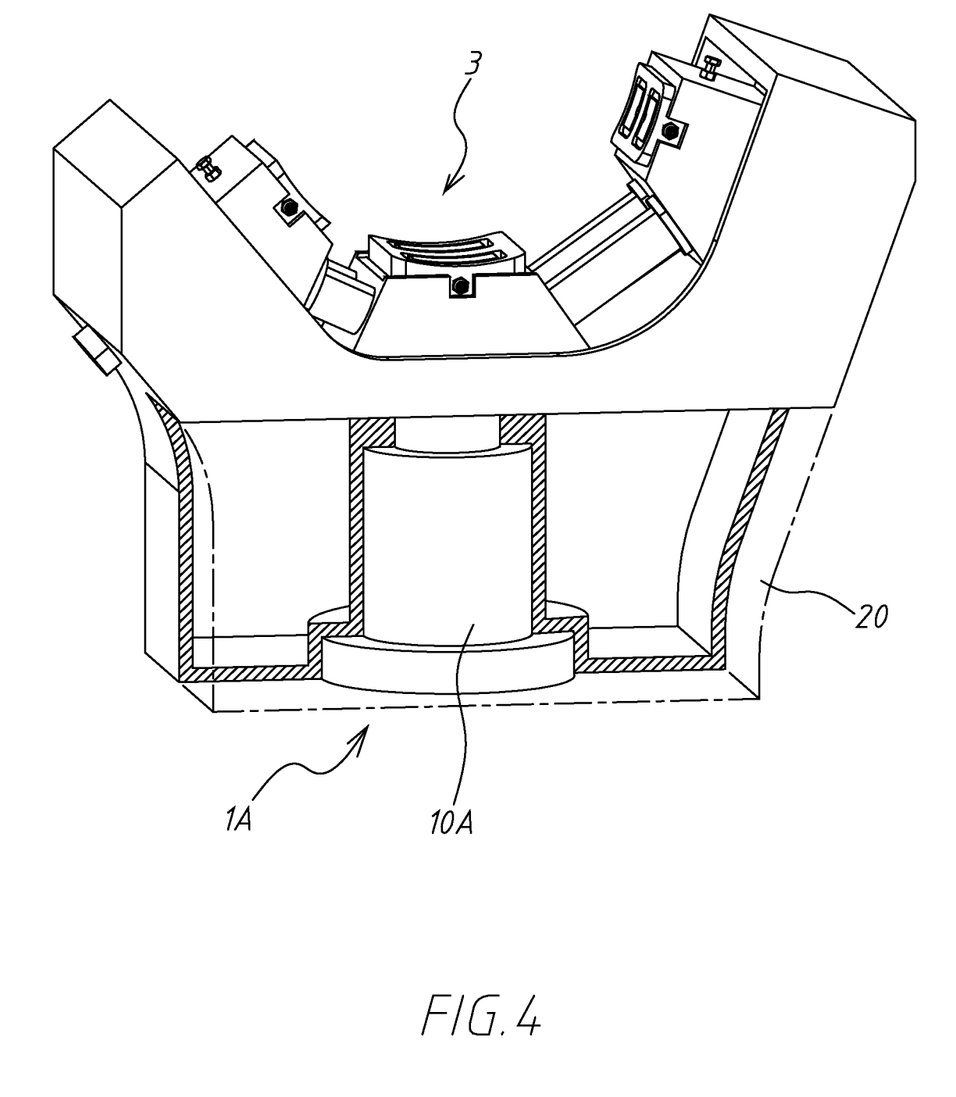
FIG. 4 is a partial cross sectional view of an auto-centering apparatus of a steady rest according to a second embodiment of the present disclosure.

Please refer to FIG. 4, which is a partial cross sectional view of an auto-centering apparatus of a steady rest according to a second embodiment of the present disclosure. As shown in FIG. 4, the base part 20 and the loading unit 31 are the same parts as those described in the first embodiment. Nevertheless, in this second embodiment, the lift-up module 1A is composed of a hydraulic cylinder 10A that is arranged coupling to the main support rod so as to be used for driving the main support rod.

Figure 5:
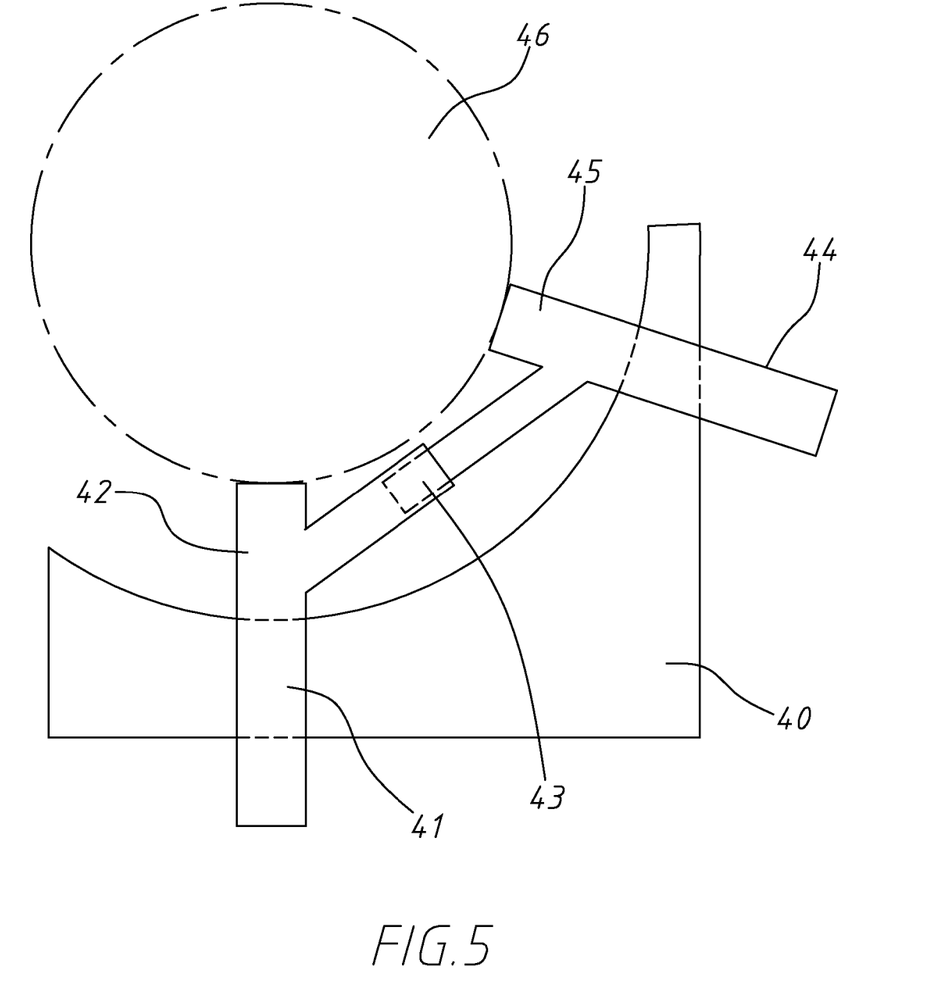
FIG. 5 is a schematic diagram showing an auto-centering apparatus of a steady rest according to a third embodiment of the present disclosure.
Figure 6:
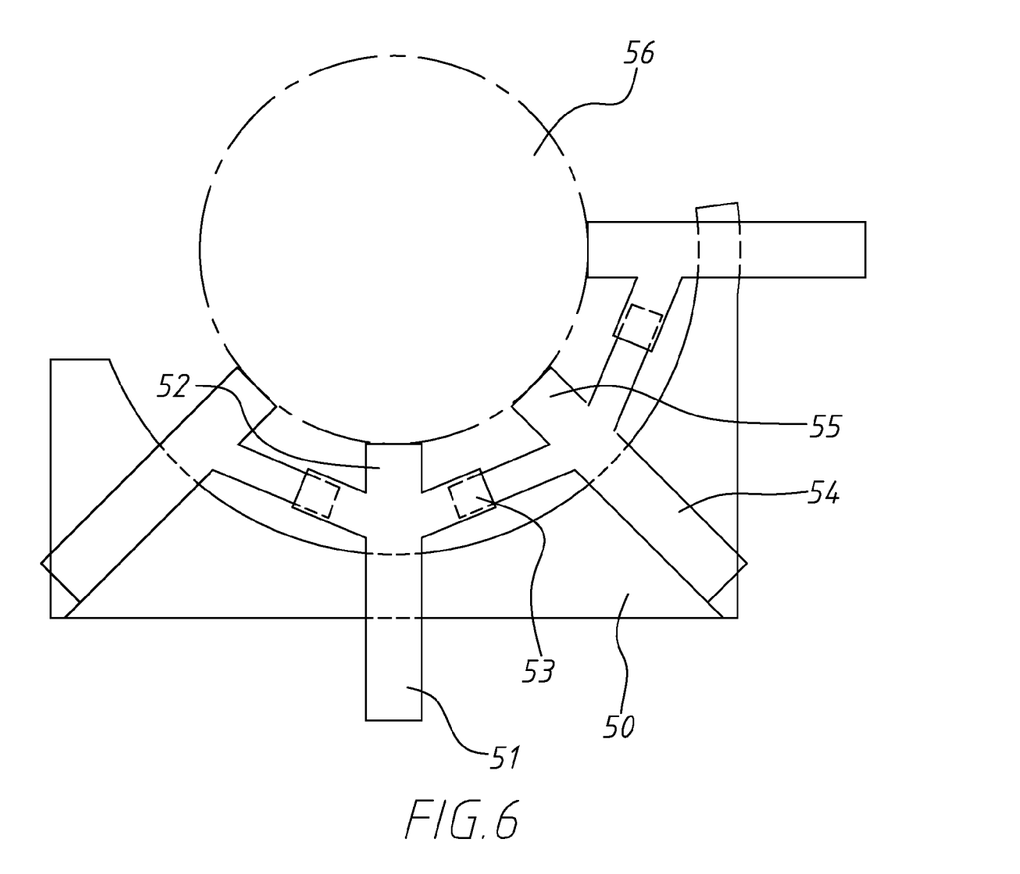
FIG. 6 is a schematic diagram showing an auto-centering apparatus of a steady rest according to a fourth embodiment of the present disclosure.

Please refer to FIG. 5 and FIG. 6, which are schematic diagrams showing respectively an auto-centering apparatus of a steady rest according to a third embodiment of the present disclosure and another auto-centering apparatus of a steady rest according to a fourth embodiment of the present disclosure. It is noted that the lift-up modules used in this third and fourth embodiments are the same parts as those described in the first embodiment or the second embodiment, and thus will not be described further herein.

In FIG. 5, there are one main support part 42 and one side support part 45 being disposed at the top of the base part 40. Since there is only one side support part 45 that is disposed at a side of the main support part 42, there is only one connecting unit 43 located between the main support part 42 and the side support part 45.

Similarly, there is a main support rod 41 coupled to the bottom of the main support part 42 that is arranged extending into the base part 40. Moreover, as shown in FIG. 5, both the main support part 42 and the side support part 45 are arranged engaging to a workpiece 46 by the tops thereof.

In the fourth embodiment shown in FIG. 6, there are one main support part 52 and a plurality of side support parts 55 being disposed at the top of the base part 50. Moreover, there can be a number of side support parts 55 being disposed at one side of the main support part 52 or there can be a number of side support parts 55 being disposed at both sides of the main support part 52, and the amount of the side support parts 55 that is disposed at each side of the main support part 52 can be determined according to actual loading requirement, that is, the amount of the side support parts 55 that is disposed at one side of the main support part 52 can be equal to the amount of the side support parts 55 that is disposed at another side of the main support part 52; or the amount of the side support parts 55 that is disposed at one side of the main support part 52 can be larger than the amount of the side support parts 55 that is disposed at another side of the main support part 52 if there is a need for radial support. Similarly, the main support part 52 and the side support parts 55 are arranged engaging to a workpiece by the tops thereof. Moreover, there is one connecting unit 53 disposed between the main support part 52 and one side support part 55 neighboring thereto, while there is also one connecting unit 53 being disposed between any two neighboring side support parts 55. There is a main support rod 51 coupled to the bottom of the main support part 52 that is arranged extending into the base part 50, and also there is a side support rod 54 coupled to the bottom of each support part 55 that is arranged extending into the base part 50.

Figure 7:
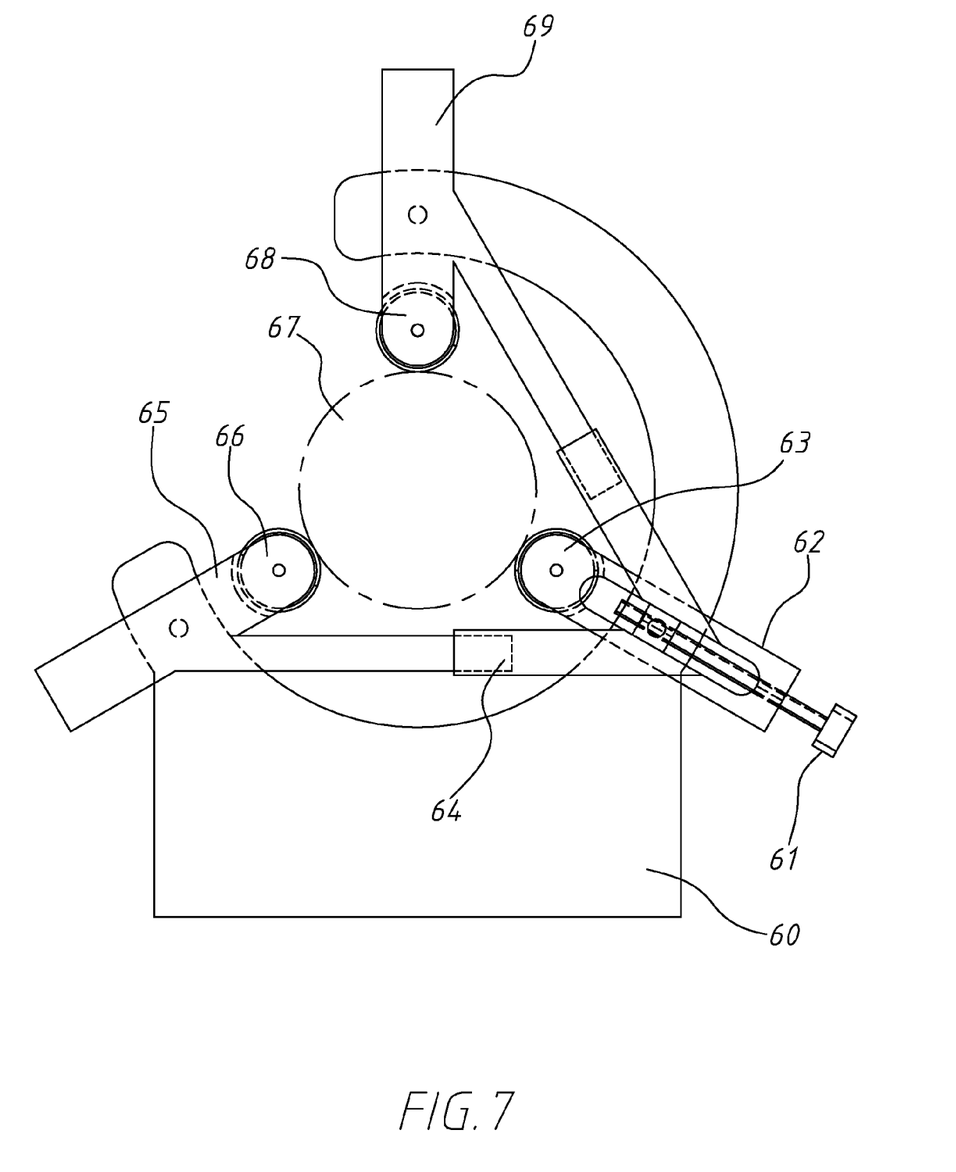
FIG. 7 is a schematic diagram showing an auto-centering apparatus of a steady rest according to a fifth embodiment of the present disclosure.

Please refer to FIG. 7, which is a schematic diagram showing an auto-centering apparatus of a steady rest according to a fifth embodiment of the present disclosure. The auto-centering apparatus of a steady rest according to this fifth embodiment comprises: a base part 60, a lift-up module 61, a main support part 62, at least one side support part 65, at least one connecting unit 64 and at least one loading unit 63, 66, 68.

The main support part 62 is disposed on the base part 60 and is configured with a main support rod that is extending into the base part 60.

The at least one side support part 65 is disposed on the base part 60 at a side thereof. If there is more than one such side support parts 65, they will be arranged respectively at the two sides of the main support part 62. It is noted that each side support part 65 is configured with a side support rod that is also extending into the base part 60. The connecting unit 64 is arranged between the main support part 62 and the side support part 65.

The lift-up module 61 is disposed on the base part 60 and is substantially a screw rod in this embodiment that is arranged for enabling one end thereof to pierce through the main support rod and fix to the base part 60 by screwing. In addition, the loading units 63, 66, 68 are disposed respectively at the tops of the main support part 62 and the side support parts 65, 69. In this embodiment, the loading units 63, 66, 68 are rollers. As shown in FIG. 7, there is a workpiece 67 placed on top of the main support part 62 and the side support parts 65, 69 while allowing the loading units 63, 66, 68 to engage to the workpiece 67 by contact to secure firmly.

As shown in FIG. 2, when the hand wheel 10 is being driven to rotate, the first driving gear 11 will be driven to rotate thereby, which is then cause the second driving gear 12 to be brought along to rotate by the rotating first driving gear 11, and then eventually the rotating second driving gear 12 will drive the lead rod 13 to rotate. Moreover, the rotating lead rod 13 is going to drive the main support rod 37 to move upward which pushes the main support part 30 to raise, and thereby, since the main support part 30 is connected to a side support part 33 by the connecting unit 32, the raising main support part 30 will also cause the side support part 33 to move upward in synchronization whereas the side support rod 36 is being brought along to move upward as well for supporting the side support part 33.

On the other hand, when the rotating of the hand wheel 10 is reversed, the main support part 30 will be driven to move downward, the main support rod 37 will also be brought along to move downward, and consequently, the side support part 33 will be driven to move downward and thus the side support rod 36 will also be brought along to move downward.

In an embodiment, when the connecting unit 32 is a hydraulic cylinder, the raising of the main support part 30 will compress the hydraulic cylinder, and on the other hand, when the main support part 30 is driven to move downward back to its initial position, the compressed hydraulic cylinder will be released and recovered also back to its initial state.

In another embodiment, when the connecting unit 32 is an assembly of linkage bars and sleeves, the raising or dropping of the main support part 30 will cause the linkage bars to move reciprocally inside their corresponding sleeves.

It is noted that as soon as the main support part 30 and the side support parts 33 are being raised to a specific height, the loading units 31, 34 are being driven to be located at positions for allowing the two to engage with a workpiece simultaneously while enabling the workpiece to be centered automatically.

The adjustment units 35 are provided for adjusting the relative positioning of loading units 31, 34, with respect to the main support part 30 and the side support part 33. In an embodiment when the adjustment unit 35 is substantially an adjusting screw, the loading units 31, 34 can be moved freely for adjusting their relative positions toward the main support part 30 and the side support part 33 when the corresponding adjusting screws 35 are loosed, and on the other hand, when the adjusting screws are tightened, the positions of the loading units 31, 34 are fixed. Thereby, by the adjusting the positioning of the loading units 31, 34 with respect to the main support part 30 and the side support part 33, the loading units 31, 34 can be placed and orientated for allowing they to engage more closer toward the workpiece.

In FIG. 4, the lift-up module 1A is configured with a hydraulic cylinder 10A which can be used for driving the support module 3 to move upward or downward. In FIG. 7, the lift-up module 61 is a screw rod, which can drive the main support part 62 and the side support part 65 to move upward or downward when this screw rod is being driven to rotate clockwisely or counterclockwisely.

Figure 8:
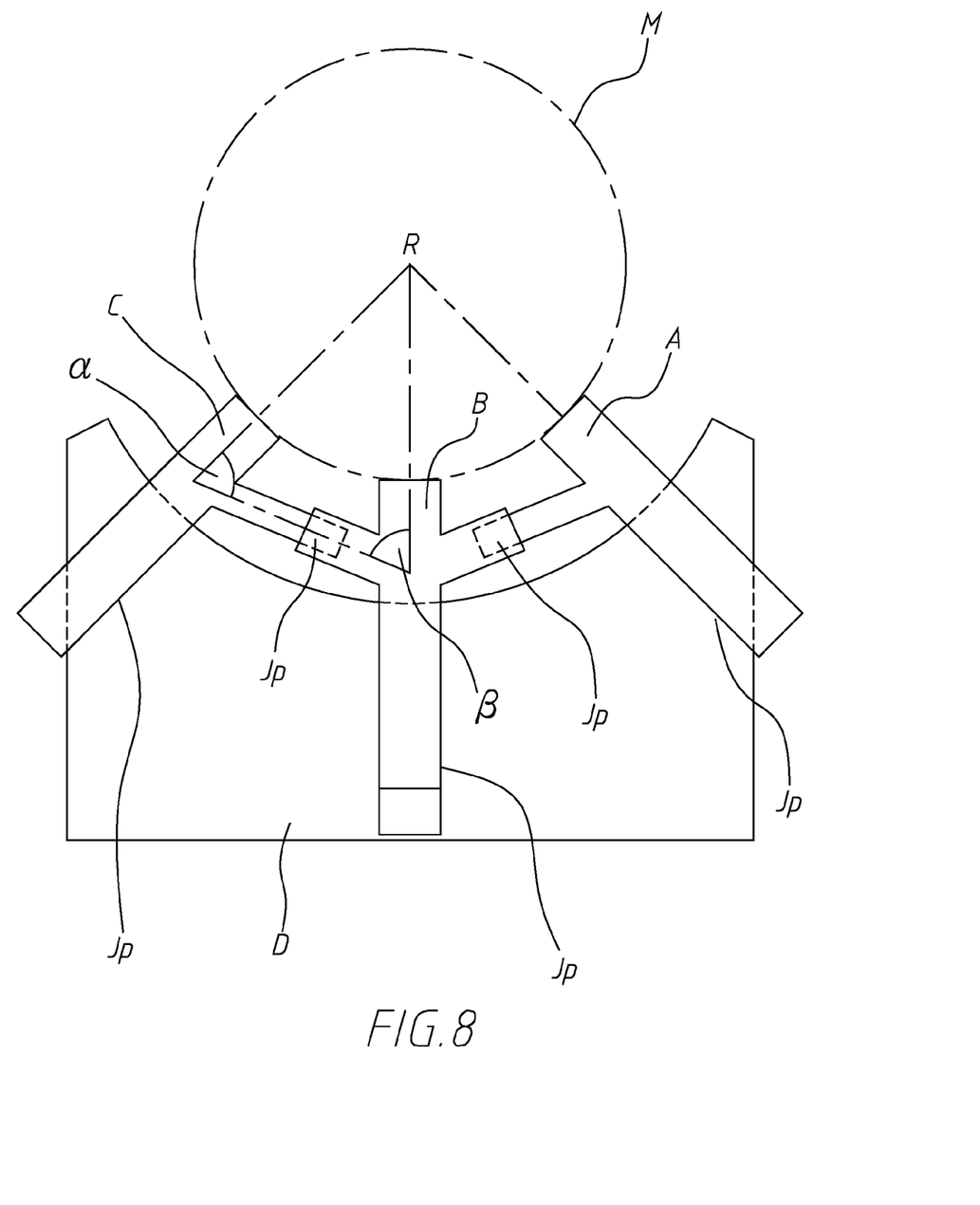
FIG. 8 is a schematic diagram showing the movable degree-of-freedom of a planar mechanism for auto-centering.

Please refer to FIG. 8, which is a schematic diagram showing a movable planar mechanism. In FIG. 8, the base part D is defined to be the link 1, the main support rod B is defined to be link 2, one side support rod A is defined to be link 3, and another side support rod C is defined to be link 4. The link 1 is coupled to the link 2 using a prismatic joint ($J_p$) design, the link 1 is coupled to the link 3 using a prismatic joint design, the link 1 is coupled to the link 4 using a prismatic joint design, the link 2 is coupled to the link 3 using a prismatic joint design, and the link 2 is coupled to the link 4 using a prismatic joint design.

As shown in FIG. 8, each link in a planar mechanism has three degree-of-freedom (DOF). That is to say, when a link is in plane motion, without any constraint it can move freely in the X-Y plane coordinate system, and it can also rotate around an axis that is perpendicular to X-Y plane. Therefore the freedom of planar mechanism ($F_p$) is determined according to the following formula:

$$Fp=3(N-1)-2(J_R+J_P+J_O)-(J_A+J_G)$$

wherein, N represents the total number of the link;
$J_R$ represents the total number of the revolute pair;
$J_O$ represents the total number of the rolling pair;
$J_A$ represents the total number of the cam pair;
$J_G$ represents the total number of the gear pair;
$J_P$ represents the total number of the prismatic pair.

In an embodiment of the present disclosure, N=4, $J_R$=5, $J_R=J_A=J_G=J_O$=0, and therefore, the resulting DOF=−1, representing a rigid kinematic chain. Generally, a common rigid kinematic chain is not movable, but in certain special dimension, additional DOF can be generated for creating a moveable over constrained kinematic chain.

As shown in FIG. 8, when the centerlines of link 2, link 3 and link 4 pass through the center R of the circle, and the angle α equals to the angle β, forming an isosceles triangle, the circle can be treated as a workpiece M. Thus, each component in this planar mechanism has two degree-of-freedom.

Therefore, the degree-of-freedom ($F_p$) of the planar mechanism is determined by the following formula:

$$F_p=2(N-1)-(J_R+J_P+J_O)$$

As indicated in the foregoing description that N=4, $J_R$=5, and $J_R=J_A=J_G=J_O$=0, the resulting DOF=1 which representing a movable kinematic chain. Therefore, single input of link2, or link 3, or link4 is required to drive this planar mechanism to move synchronously in equal-displacement manner so as to achieve an auto-centering functionality.

To sum up, the present disclosure uses a lift-up module and a connecting unit to drive a main support part to move in synchronization with at least one side support part so as to achieve a centering effect with no need to adjust the main support part and the side support part individually.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. An auto-centering apparatus of a steady rest, comprising:
a base part;
a main support part, installed on the top of the base part;
at least one side support part, installed on the top of the base part and each located at one side of the main support part;
a lift-up module, installed in the base part and coupled to the main support part;
at least one connecting unit, installed at a position between the main support part and the at least one side support part corresponding thereto; and
at least one loading unit, each being movably disposed at the top of the main support part and the at least one side support part,
wherein the loading unit is substantially a hydrostatic bearing pad having a recessed pocket defined on the top of the loading unit, and the hydrostatic bearing pad is able to receive sufficient amount of pressurized oil therein.

2. The auto-centering apparatus of a steady rest of claim 1, further comprising:
at least one adjustment unit, respectively disposed at a side of the corresponding side support part and the main support part so as to selectively fixing the loading unit.

3. The auto-centering apparatus of a steady rest of claim 2, wherein the adjustment unit is substantially an adjustment screw having a lock block screwed to an end of the adjustment screw.

4. The auto-centering apparatus of a steady rest of claim 1, wherein the main support part is further configured with a main support rod at the bottom of the main support part, and the main support rod is arranged extending into the base part; the lift-up module is further configured with a hand wheel, a first driving gear, a second driving gear and a lead rod in a manner that the hand wheel is disposed at a side of the base part while allowing an end of the hand wheel to extend to the outside of the base part, one end of the first driving gear is coupled to the hand wheel, another end of the first driving gear is coupled to one end of the second driving gear, and another end of the second driving gear is coupled to one end of the lead rod while allowing another end of the lead rod to couple to the main support rod.

5. The auto-centering apparatus of a steady rest of claim 4, wherein each of the first driving gear and the second driving gear is substantially a bevel gear, and the lead rod is substantially a lead screw.

6. The auto-centering apparatus of a steady rest of claim 1, wherein the main support part is further configured with a main support rod at the bottom of the main support part, and the main support rod is arranged extending into the base part; and the lift-up module is further configured with a hydraulic cylinder in a manner that the hydraulic cylinder is coupled to the main support rod.

7. The auto-centering apparatus of a steady rest of claim 1, wherein the main support part is further configured with a main support rod at the bottom of the main support part, and the main support rod is arranged extending into the base part; and the lift-up module is substantially a screw rod being arranged for enabling one end of the screw rod to pierce through the main support rod and fix to the base part by screwing.

8. The auto-centering apparatus of a steady rest of claim 1, wherein the connecting unit is a device selected from the group consisting of: a hydraulic cylinder and an assembly of linkage bars and sleeves.

9. The auto-centering apparatus of a steady rest of claim 1, wherein each side support part is further configured with a side support rod that is arranged extending into the base part.

10. The auto-centering apparatus of a steady rest of claim 1, wherein a first plurality of side support parts are disposed at one side of the main support part and simultaneously a second plurality of side support parts are disposed at another side of the main support part, while allowing the at least one connecting unit to be arranged at a position between the first and the second pluralities of side support parts that are being disposed respectively at the two sides of the main support part.

11. The auto-centering apparatus of a steady rest of claim 10, wherein an amount of the side support parts that are disposed at one side of the main support part is equal to an amount of the side support parts that are disposed at another side of the main support part; or the amount of the side support parts that are disposed at one side of the main support part is larger than the amount of the side support parts that are disposed at another side of the main support part.

\* \* \* \* \*